No. 672,029. Patented Apr. 16, 1901.
G. A. BURWELL.
ELECTRIC GENERATOR.
(Application filed Jan. 17, 1901.)
(No Model.)
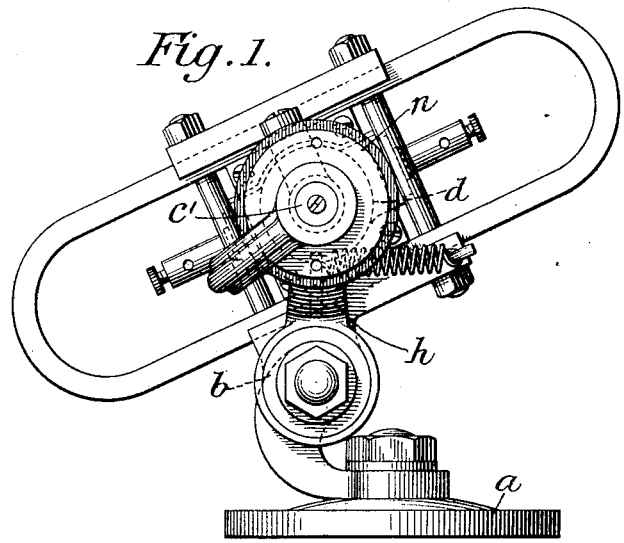
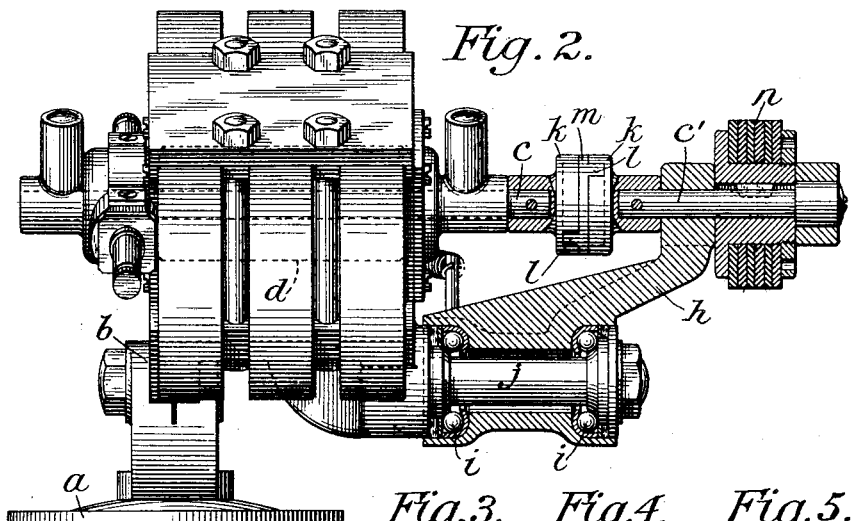
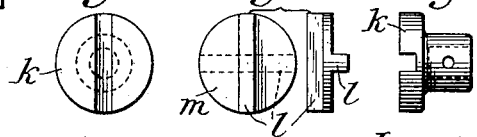
Attest:
A. N. Jesbera
J. M. Scoble
Inventor:
George A. Burwell
by Redding Kiddle & Greeley
Attys.

UNITED STATES PATENT OFFICE.

GEORGE A. BURWELL, OF PLATTSBURG, NEW YORK.

ELECTRIC GENERATOR.

SPECIFICATION forming part of Letters Patent No. 672,029, dated April 16, 1901.

Application filed January 17, 1901. Serial No. 43,560. (No model.)

*To all whom it may concern:*

Be it known that I, GEORGE A. BURWELL, a citizen of the United States, residing at Plattsburg, in the State of New York, have invented certain new and useful Improvements in Electric Generators, set forth in the annexed specification.

The objects of this invention are to prevent straining and bending of the armature-shaft and consequent heating of the shaft-bearings and to insure uniform rotation of the armature; and the invention consists in providing the armature with a flexible shaft that is constructed of two parts connected by a suitable coupling, so that one of said parts may have movement independent of the other part.

In the accompanying drawings, Figure 1 represents an end elevation of the generator. Fig. 2 represents a side elevation of the same, partly in section. Figs. 3, 4, and 5 are detailed views illustrating the shaft-coupling.

The generator may be of any desired construction, and preferably is adjustably secured upon a fixed base or support $a$ by means of a suitable joint $b$. The armature-shaft is constructed in two parts, one of said parts $c$ being rigidly secured to the armature $d$ and the other part, $c'$, of the shaft being journaled in bearings provided on an arm $h$. This arm is rotatably mounted, preferably, on ball-bearings $i$ upon a stud $j$, secured to or formed integral with the generator-frame. The adjacent ends of the shaft are each provided with a head $k$, having a groove formed therein. These grooves are adapted to receive ribs $l$, formed at right angles on the opposite faces of a coupling-piece $m$. The coupling-piece is movable in the grooves and permits the portion of the shaft having a bearing on the arm to change its position in relation to the fixed portion of the shaft and at the same time provides a positive coupling between these parts. A driving-pulley $n$ is keyed upon the movable portion of the shaft, so that the armature can be rotated. The driving-pulley may be actuated either by a belt connected with a suitable source of power or by direct contact with a wheel upon an engine or motor. This construction is especially adapted for use in connection with small generators, and particularly those used on moving conveyances, where all parts of the machinery are subjected to more or less jar. Heretofore it has been impossible to obtain a uniform rotation of the armature-shaft in such cases unless considerable force was exerted against the driving-pulley. This caused wear and friction on the bearings of the armature-shaft, and as a result the bearings became heated. The heat thus generated became the means of spreading the oil or other lubricant used in the journals over the armature and the commutator, which invariably formed a short circuit, thereby interfering with the operation of the generator and requiring constant care on the part of the operator to keep the brushes and commutator free from oil. By permitting movement of the driving part of the armature-shaft independent of the driven part thereof the bearings for the fixed part of the shaft do not become heated, no matter what pressure is exerted against the driving-pulley, and the armature is always rotated at an even speed.

I claim as my invention—

1. In an electric generator, an armature-shaft consisting of two parts, one of said parts being movable in relation to the other part, and a coupling between said parts comprising two coupling-heads rigidly secured to said parts, said heads being movable only in parallel planes, substantially as described.

2. In an electric generator, an armature-shaft consisting of two parts, one of said parts being fixed, the other part being journaled in a bracket movable on the frame of the generator, and a coupling between said parts of the shaft, substantially as described.

3. In an electric generator, the combination of an armature-shaft consisting of two parts, one of said parts being movable in relation to the other part, a bracket provided with a bearing for said movable part of the armature-shaft, said bracket being rotatable upon a stud secured to the armature-frame, roller-bearings between said stud and bracket and a coupling between the parts of the shaft, substantially as described.

In testimony whereof I sign this application, in the presence of two witnesses, this 11th day of January, 1901.

GEORGE A. BURWELL.

Witnesses:
THOMAS R. COTTER,
ELIZABETH TAYLOR.